United States Patent Office 2,762,517
Patented Sept. 11, 1956

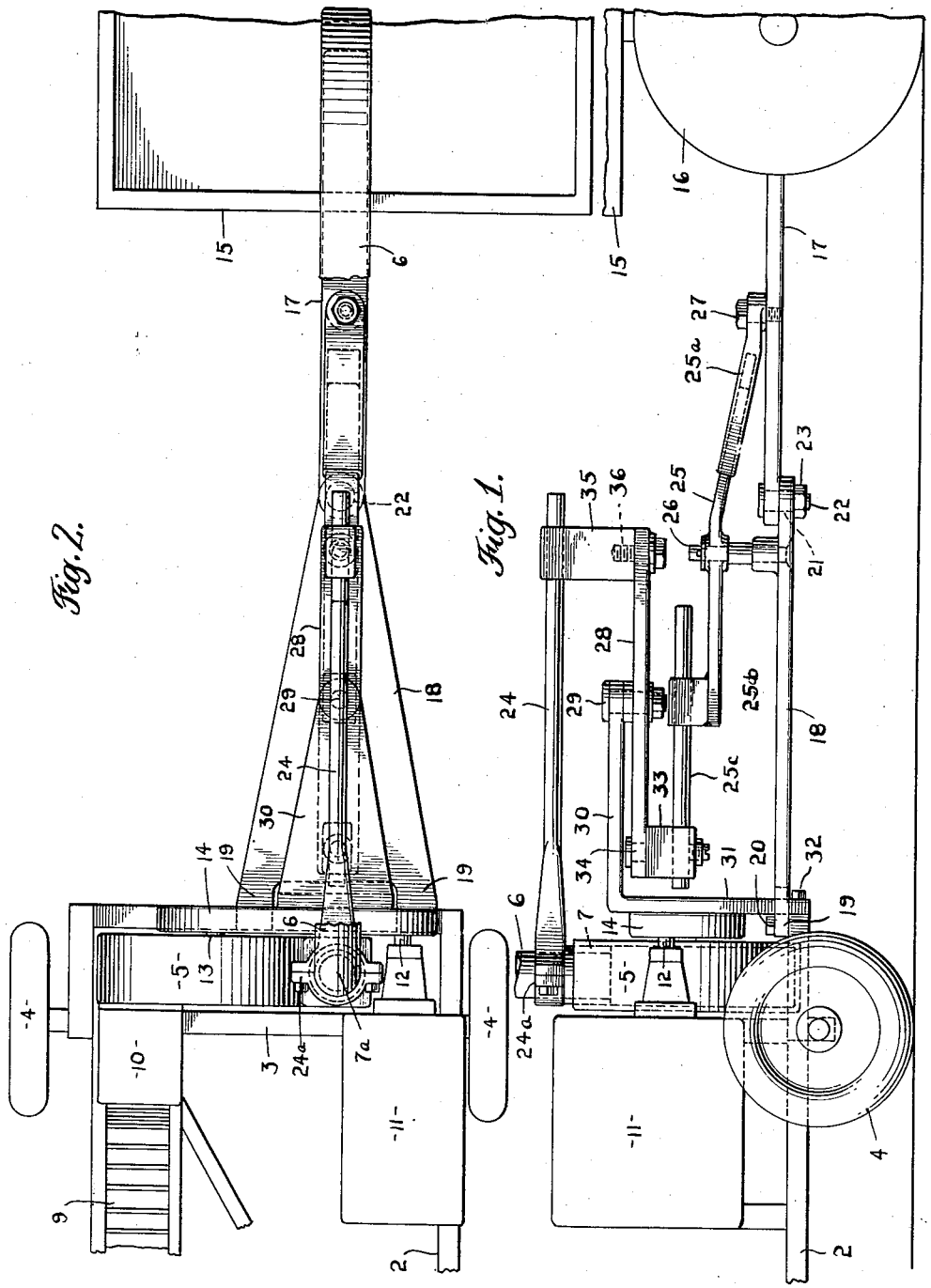

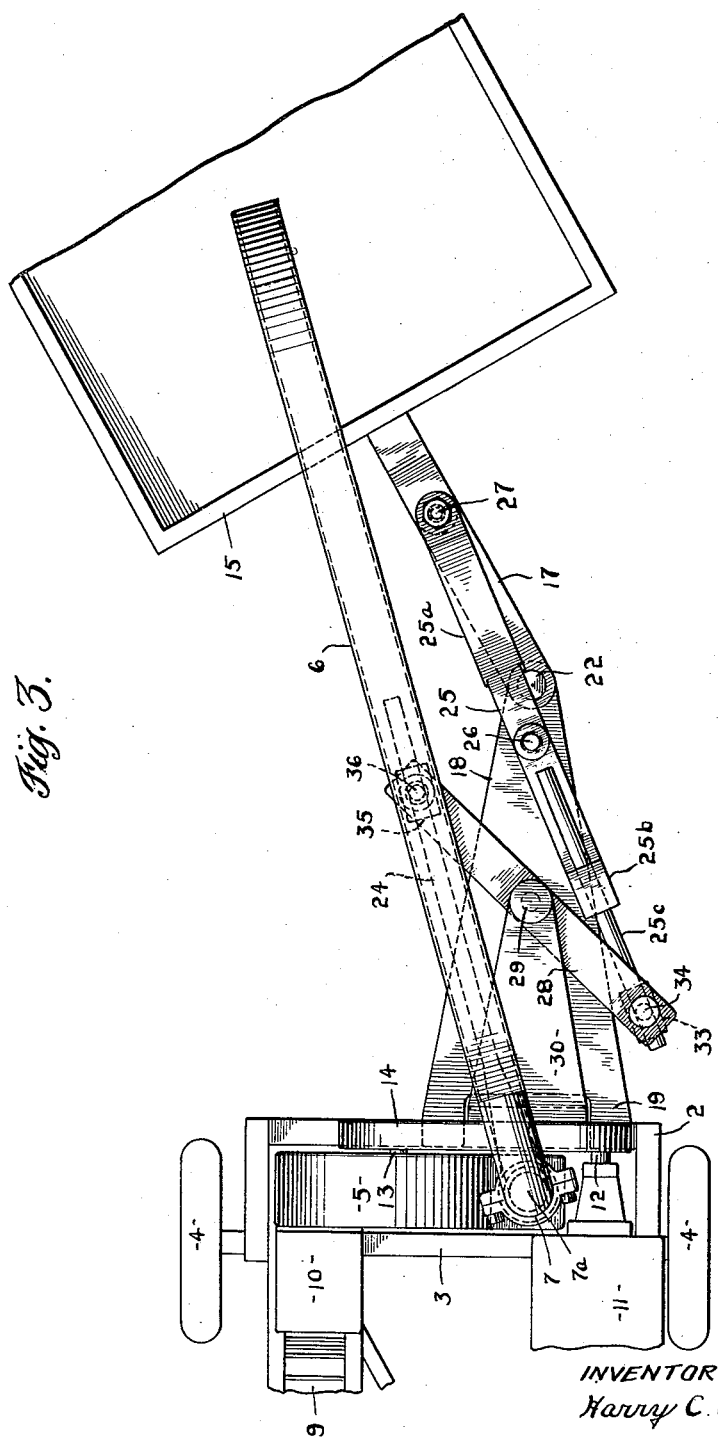

2,762,517

FORAGE HARVESTER DISCHARGE SPOUT LOCATER

Harry C. Eberly, New Holland, Pa., assignor, by mesne assignments, to Sperry Rand Corporation, New Holland, Pa., a corporation of Delaware Application December 1, 1953, Serial No. 395,573

7 Claims. (Cl. 214—42)

This invention relates to a blower discharge spout locater for use with a field forage harvester or other field traversing crop processing machine which discharges the processed crop material into a trailing wagon.

It is recognized that attempts have heretofore been made to maintain the discharge end of a swivelled blower discharge spout of a forage harvester over a trailing wagon by linkage means directly connecting the spout to the wagon box. In such arrangements the linkage has been employed to control the swivelling of the discharge spout solely in response to relative lateral angular movement between the wagon box and the crop processing machine during the making of turns. No provision has been made for counteracting the distortion of the resulting control movement which occurs during turns due to the bodily lateral displacement of the processing machine and its discharge spout relative to the turning path of the trailing wagon. Such lateral displacement and its adverse effects on the location of the terminal end of the swivelled discharge spout may be very considerable with the result that the spout may be caused to discharge the processed material onto the ground rather than into the wagon box.

With the foregoing in mind, the discharge spout locating mechanism of the instant invention operates on an entirely different and new principle, in accordance with which the swivelling of the discharge spout is controlled responsive to the angular relationship between the processing machine or forage harvester and the draft tongue of the trailing wagon.

A primary feature of the invention consists in employing a control member or lever fulcrumed on the processing machine at a location spaced somewhat from the pivotal coupling between the processing machine and wagon tongue and connected to the discharge spout, the lateral or angular displacement of the fulcrum point of the control lever relative to the wagon tongue during turning movements being employed to modify the extent of swinging movement transmitted from the control element to the swivelled discharge spout so as to maintain the discharge end of the spout accurately directed into the wagon box of the trailing wagon at all times.

A further feature consists in the novel utilization of a movement reversing mechanism for transmitting movement from the control lever to the spout. The preferred embodiment of the invention incorporating the foregoing features and advantages is illustrated in the accompanying drawings in which:

Figure 1 represents a fragmentary side elevation of a field forage harvester behind which is towed a usual farm wagon, shown in part only, the discharge spout locating mechanism of the invention being employed to maintain the discharge spout of the forage harvester located at all times over the wagon box.

Figure 2, a plan view of the construction illustrated in Figure 1;

Figure 3, a plan view similar to Figure 2 showing the relative positions of the various parts as the field forage harvester enters into a turn.

Referring now in detail to the accompanying drawings, there is shown the rear portion of the rigid frame 2 of a field forage harvester having an axle 3 on which are operatively supported the usual ground traversing wheels 4 whereby the wheeled frame 2 may be coupled to a usual farm tractor to be towed therebehind in usual manner. Within a housing 5 on the frame 3 is supported a conventional ensilage chopping and blowing element (not shown) which, after comminuting material within the housing 5, discharges it upwardly through a discharge spout 6 which communicates with the interior of the housing 5 and is swively associated therewith as at 7 in Figure 1 for rotary movement about a substantially vertical axis. As the forage harvester or crop processing machine is drawn over the ground behind the tractor a suitable crop pick-up means (not shown) delivers crop material onto the feed apron 9 of Figure 2 which conveys it beneath the upper feed or hold-down element 10 of said figure through a suitable opening into the interior of the housing 5. Upon being received in the housing 5 the crop material is immediately comminuted and discharged through the spout 6, all as is well known in the art and as will be readily apparent to those skilled in the particular field to which the invention appertains. In accordance with usual practice the mechanism within the housing 5 may be driven from a motor 11 supported on the frame 2, the output shaft 12 of the motor in such case being connected to the drive shaft 13 of the blower and chopper element within the housing 5 by suitable power transmission means disposed within the conventional shield or housing 14.

It will be seen that where the crop processing machine and its associated trailing wagon are moving in a straight line as depicted in Figures 1 and 2, the discharge spout 6 will normally extend laterally rearwardly parallel to the line of draft, with its discharge end disposed above the wagon box 15 of the trailing wagon. The wagon box 15 is supported in conventional manner on a usual wheeled frame, of which the forward or steering wheels 16 only are indicated fragmentarily in Figure 1. It will be understood that the wagon tongue 17 of this wagon structure is pivotally connected to the wheeled frame for lateral swinging movement and also is associated with the wheels 16 to steer said wheels responsive to lateral swinging of the wagon tongue 17 about its said pivotal connection to the wagon frame. Preferably the said pivotal connection between the wagon tongue 17 and the wagon frame is located directly beneath the discharge end of the spout 6 in Figure 2.

It will be noted that the frame 2 is provided with a rigid rearward extension or hitch portion 18 having laterally spaced legs 19 bolted or otherwise rigidly secured to the said frame 2 as at 20 (see Figure 1.) At its rear extremity this hitch portion 18 is provided with suitable hitch means whereby it may be operatively pivotally connected with the wagon tongue 17. To this end the hitch portion 18 may be provided with a vertical aperture 21 therethrough whereby a hitch pin 22 inserted through this and a similar aperture in the wagon tongue 17 may provide a pivotal connection between members 17 and 18. A bolt 23 threaded on the lower end of the pivot pin 21 may serve to secure same against displacement. Preferably the hitch pin 21 is loosely received in the respective members 17 and 18 and sufficient clearance is left between the nut 23 and said members to permit a vertical swinging of the wagon tongue 17 about the vertical pin 22 as is necessary in order to permit the trailing wagon to rise and fall relative to the processing machine in traversing uneven terrain.

3

In order to provide a convenient means for swivelling the spout 6 same is provided with a control arm 24 extending radially therefrom and clamped or otherwise fixedly secured thereon as at 24a. This control arm 24 merely exemplifies one suitable means by which the swivel spout 6 may be operatively connected to the mechaism hereinafter described for automatically swivelling the spout 6 to cause it to discharge at all times into the wagon box 15.

Essentially such mechanism comprises a normally fore and aft extending control lever, generally designated 25, which is medially fulcrumed on the hitch member 18 of the machine at a location somewhat forwardly of the hitch pin 22 for lateral swinging movement about the substantially vertical pivot post 26. The rear end of this control lever 25 is connected to the wagon tongue 17 for swinging movement therewith. Inasmuch as the lever 25 and the wagon tongue 17 swing about different axes 26 and 22, respectively, it is necessary to provide a connection which will permit both pivotal and longitudinal movement between the members 25 and 17. Accordingly the rear end portion of the lever 25 is telecopically received in a socketed member 25a which is pivotally connected to the wagon tongue 17 by the vertical pivot element 27, the element 27 being appled loosely enough to permit vertical play of the socketed member 25a such as will occur incident to movement of the processing machine and trailing wagon over uneven ground.

Suitable movement reversing means operatively interconnected between the forward end of the lever 25 and the spout control arm 24 functions to swing the arm 24 and spout 6 reversely to the swinging of the said forward end of the lever 25, responsive to lateral swinging of the wagon tongue 17 about its pivot pin 22, to thereby maintain the discharge end of the spout 6 over the wagon box 15 at all times.

For purposes of exemplification such movement reversing means is embodied in a rigid lever or link 28 which is medially fulcrumed as at 29 on a bracket 30 for lateral swinging movement. The bracket 30 which functions as a part of the machine frame 2 comprises a depending portion 31 which depends between the relatively spaced attaching links 19 of hitch member 18 and is securely bolted or otherwise affixed to the machine frame 2 as at 32. (See Figure 1.)

The forward end of the reversing lever 28 is connected to the forward end of the control lever 25 for swinging movement therewith. Since these levers 25 and 28 in the instant embodiment are swingable about their relatively displaced axes 26 and 29, respectively, it becomes necessary that their interconnection permit both longitudinal and angular movement between their interconnected ends. To this end the control lever 25 is provided at its forward end with a rigidly affixed slide bearing 25b through which is slideably disposed a longitudinal extension 25c of this lever, said extension 25c being received and held in a clamp member 33 which is pivoted at 34 on the forward end of reversing lever 28. Thus, during swinging of the levers 25 and 28 about their respective axes, the relative longitudinal and angular movements of their respective free ends will be taken up by the slide bearing 25b and the pivot 34 in obvious manner.

The connection between the reversing lever 28 and the control arm 24 may be readily accomplished by means of a slide bearing 35 pivoted as at 36 on the rear end of reversing lever 28 and slideably receiving the control arm 24 through an appropriately disposed opening or bore therethrough as shown.

The lengths of the levers 25 and 28, the locations of their respective pivot points and of their connections to each other and to the wagon tongue 17 and control arm 24 are all selected in accordance with well known mechanical principles to properly locate the discharge end of the spout 6 over the wagon box 15 in any of the relatively angular positions which the wagon tongue 17 may assume about its pivot pin 22 incident to the making of turns.

It will be realized, however, that this by itself is not enough to acomplish the desired object inasmuch as during the course of a turn, as indicated in Figure 3, the swivelling axis 7a of spout 6 will be displaced laterally out of alignment with the wagon tongue 17, and will thereby tend to magnify or increase the resulting swinging of the spout 6. However, in the instant invention, this effect is counteracted by the simultaneously occuring lateral displacement or swinging of the axis 26 which defines the fulcrum of the control lever 25. It will be apparent that such displacement or movement of the axis 26 relative to the wagon tongue 17 about the hitch pin 22 will act to decrease the amount of swinging imparted to the control lever by virtue of such relative movement between the wagon tongue and the processing machine. Thus, by properly choosing the location of the fulcrum 26 in accordance with usual mechanical principles, the swinging movement of the spout 6 may be modified to the extent necessary to maintain its discharge end properly positioned over the wagon body 15 at all times.

Thus, it will be apparent that by the instant invention I have been able to achieve a new mode of controlling the swinging of the discharge spout responsive to turns, namely, by linking said spout to the wagon tongue for actuation in response to the pivoting of said tongue about its hitch point 22. Moreover it will be apparent that I have discovered a new and effective way of modifying such swinging movement in order to counteract the effect thereon of bodily lateral movement occuring between the discharge spout and the wagon during the making of turns.

In this application I have shown and described only the preferred embodiment of the invention simply by way of illustrating the preferred mode contemplated by me of carrying the invention into practice. However, I recognize that the invention is capable of other and different modifications and that its several details may be changed in various ways, all without departing from the invention. Accordingly, the drawings and description herein are to be considered as merely illustrative in nature and not as exclusive.

Having thus described the invention, I claim:

1. In combination with a field traversing crop processing machine having a swivelled discharge spout, and a wagon having its wagon tongue pivotally coupled to said machine rearwardly of the swivelling axis of said spout, mechanism for automatically swivelling said spout to cause it to discharge at all times into the wagon comprising, a control arm fixed on said spout radially to its swivelling axis, a normally fore and aft extending control lever medially fulcrumed on said machine, the rear end of said control lever being connected to said wagon tongue for swinging movement therewith, movement reversing means operatively interconnected between the forward end of said control lever and said control arm to swing the latter reversely to the swinging of said lever, the fulcrum of said control lever being located forwardly of the said pivotal coupling, whereby relative turning of said machine and said wagon tongue about said coupling will offset the said fulcrum to one side of the major axis of said tongue and thereby modify the amplitude of the swinging movement of the control lever.

2. In combination with a field traversing crop processing machine having a swivelled discharge spout and a wagon having its combined steering and draft tongue pivotally coupled to said machine rearwardly of the swivelling axis of said spout, mechanism for automatically swivelling said spout to cause it to discharge at all times into the wagon comprising, a normally fore and aft extending control lever medially fulcrumed on said machine, the rear end of said control lever being connected to said tongue for swinging movement therewith, movement reversing means operatively interconnected between the forward end of said control lever and said swivelled spout to swing the latter reversely to the swinging of said forward end, the fulcrum of said control lever being located forwardly of the said pivoted coupling, whereby relative turning of said machine and said wagon tongue about said coupling will offset the said fulcrum to one side of the major axis of the tongue and thereby modify the amplitude of the swinging movement of the control lever.

3. In combination with a field traversing crop processing machine having a swivelled discharge spout, and a wagon having its combined steering and draft tongue pivotally coupled to said machine rearwardly of the swivelling axis of said spout, mechanism for automatically swivelling said spout responsive to turning of said machine and wagon to cause it to discharge at all times into the wagon comprising, a control arm fixed on said spout radially to its swivelling axis, a normally fore and aft extending control lever medially fulcrumed on said machine, the rear end of said control lever being connected to said wagon tongue for swinging movement therewith, movement reversing means operatively interconnected between the forward end of said control lever and said control arm to swing the latter reversely to the swinging of said forward end of the control lever, the fulcrum of said control lever being located forwardly of the said pivotal coupling.

4. The combination of claim 3 including means defining a longitudinally extensible pivotal connection between the rear end of said control lever and said wagon tongue.

5. The combination of claim 3 in which said movement reversing means comprises a reversing lever medially fulcrumed on the machine, the forward end of said reversing lever being connected to the forward end of said control lever for swinging movement therewith, and the rear end of said reversing lever being connected to said control arm to impart swinging movement thereto reversely to the forward end of said control lever.

6. In a field traversing crop processing machine having a discharge spout swivelled for movement about a substantially vertical axis, means for controlling the swivelling of said spout comprising a radial control arm fixed on said spout, a normally fore and aft extending control lever medially fulcrumed on said machine for lateral swinging movement, movement reversing mechanism interconnecting the forward end of said lever with said control arm, hitch means on said machine rearwardly of the control lever fulcrum for operative pivotal connection with a wagon tongue, the rear end of said control lever extending rearwardly of said hitch means for pivotal connection to a wagon tongue.

7. In a field traversing crop processing machine having a discharge spout swivelled for movement about a substantially vertical axis, means for controlling the swivelling of said spout comprising a radial control arm fixed on said spout, a normally fore and aft extending control lever medially fulcrumed on said machine for lateral swinging movement, and movement reversing mechanism interconnecting the forward end of said lever with said control arm, said reversing mechanism comprises a reversing lever medially fulcrumed on said machine, the forward end of said reversing lever being connected to the forward end of said control lever for swinging movement therewith, and the rear end of said reversing lever being connected to said control arm to impart swinging movement thereto.

References Cited in the file of this patent

UNITED STATES PATENTS

| | | |
|---|---|---|
| 1,306,462 | Bergerud | June 10, 1919 |
| 2,465,156 | Huddle | Mar. 22, 1949 |
| 2,608,310 | De Penning | Aug. 26, 1952 |
| 2,634,004 | Turek | Apr. 7, 1953 |

FOREIGN PATENTS

| | | |
|---|---|---|
| 500,788 | Germany | June 26, 1930 |